(12) United States Patent
Allen-Ware et al.

(10) Patent No.: US 9,541,985 B2
(45) Date of Patent: Jan. 10, 2017

(54) ENERGY EFFICIENT OPTIMIZATION IN MULTICORE PROCESSORS UNDER QUALITY OF SERVICE (QOS)/PERFORMANCE CONSTRAINTS

(71) Applicant: International Business Machines Corporation, Armonk, NY (US)

(72) Inventors: Malcolm S. Allen-Ware, Austin, TX (US); Heather L. Hanson, Austin, TX (US); David J. Palframan, Madison, WI (US); Srinivasan Ramani, Cary, NC (US); Ken V. Vu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 14/104,154

(22) Filed: Dec. 12, 2013

(65) Prior Publication Data

US 2015/0169032 A1 Jun. 18, 2015

(51) Int. Cl.
*G06F 1/32* (2006.01)

(52) U.S. Cl.
CPC ............. *G06F 1/3234* (2013.01); *G06F 1/324* (2013.01); *G06F 1/3296* (2013.01)

(58) Field of Classification Search
CPC ................................ G06F 1/324; G06F 1/3296
See application file for complete search history.

(56) References Cited

U.S. PATENT DOCUMENTS

| | | | |
|---|---|---|---|
| 7,174,469 B2 | 2/2007 | Luick | |
| 7,890,298 B2 | 2/2011 | Coskun et al. | |
| 8,010,822 B2 | 8/2011 | Marshall et al. | |
| 8,069,357 B2 | 11/2011 | Nakamura et al. | |
| 8,381,002 B2 | 2/2013 | Nayar et al. | |
| 2005/0138452 A1* | 6/2005 | Misaka | G06F 1/3203 713/320 |
| 2008/0288796 A1 | 11/2008 | Nakamura et al. | |
| 2009/0132840 A1 | 5/2009 | Talwar et al. | |
| 2011/0178652 A1 | 7/2011 | Carter et al. | |
| 2011/0239015 A1* | 9/2011 | Boyd | G06F 1/3203 713/320 |
| 2011/0296212 A1 | 12/2011 | Elnozahy et al. | |
| 2012/0227048 A1 | 9/2012 | Elnozahy et al. | |

(Continued)

OTHER PUBLICATIONS

Ansaloni, Danilo et al., "Model-driven Consolidation of Java Workloads on Multicores", IEEE 2012, 12 pages.

(Continued)

*Primary Examiner* — Albert Wang

(74) *Attorney, Agent, or Firm* — Francis Lammes; Stephen J. Walder, Jr.; Thomas E. Tyson

(57) ABSTRACT

A mechanism is provided for optimizing energy efficiency in a set of processor cores while maintaining application performance for a set of applications. A quality of service (QoS) level is received for one or more active applications in the set of applications and state information associated with each processor core in the set of processor cores is identified. Responsive to the QoS level and the state information indicating an action to be implemented, a change is implemented to reduce power utilization by one or more processor cores in the set of processor cores in the data processing system, where the change is via at least one of dynamic frequency scaling, dynamic voltage scaling, or core folding.

6 Claims, 3 Drawing Sheets

(56) References Cited

U.S. PATENT DOCUMENTS

| | | |
|---|---|---|
| 2012/0317568 A1 | 12/2012 | Aasheim |
| 2012/0331319 A1 | 12/2012 | Mathieson et al. |
| 2013/0238912 A1 | 9/2013 | Priel et al. |
| 2014/0101420 A1* | 4/2014 | Wu .................. G06F 1/3206 713/1 |

OTHER PUBLICATIONS

Bletsch, Tyler et al., "Power Aware Domain Migration in a Virtualized Cluster", http://citeseerx.ist.psu.edu/viewdoc/summary?doi=10.1.1.167.9013, Feb. 20, 2008, pp. 1-6.
Cochran, Ryan et al., "Pack & Cap: Adaptive DVFS and Thread Packing Under Power Caps", MICRO '11, Dec. 3-7, 2011, pp. 175-185.
Freeh, Vincent W. et al., "Scaling and Packing on a Chip Multiprocessor, IEEE", 2007, pp. 1-8.
Ghiasi, Soraya et al., "CPU Packing for Multiprocessor Power Reduction", PACS 2003, LNCS 3164, 2004, pp. 117-131.
IBM Corporation, "Power7+", Systems and Technology Group, Aug. 29, 2012, 15 pages.
Isci, Canturk et al., "Live, Runtime Phase Monitoring and Prediction on Real Systems with Application to Dynamic Power Management", IEEE, 2006, 12 pages.
Karpuzcu, Ulya R. et al., "EnergySmart: Toward Energy-Efficient Manycores for Near-Threshold Computing", IEEE 2013, 12 pages.
Lee, Benjamin C. et al., "Accurate and Efficient Regression Modeling for Microarchitectural Performance and Power Prediction", ASPLOS '06, Oct. 21-25, 2006, 10 pages.
Moore, Ryan W. et al., "Using Utility Prediction Models to Dynamically Choose Program Thread Counts", IEEE, 2012, pp. 135-144.
Rajamani, Karthick et al., "Online Power and Performance Estimation for Dynamic Power Management", IBM Research Report, Computer Science, RC24007 (W0607-058), Jul. 14, 2006, 11 pages.
Sharma, Vivek et al., "Power-aware QoS Management in Web Servers", IEEE, 2003, pp. 1-10.
Vega, Augusto et al., "Power-Aware Thread Placement in SMT/CMP Architectures", Fourth Workshop on Energy-Efficient Design, 2012, 6 pages.
Von Laszewski, Gregor et al., "Power-Aware Scheduling of Virtual Machines in DVFS-enabled Clusters", IEEE 2009, pp. 1-10.
Wang, Wei et al., "Performance Analysis of Thread Mappings with a Holistic View of the Hardware Resources", IEEE, 2012, pp. 156-167.
U.S. Appl. No. 14/304,411.

* cited by examiner

ENERGY EFFICIENT OPTIMIZATION IN MULTICORE PROCESSORS UNDER QUALITY OF SERVICE (QOS)/PERFORMANCE CONSTRAINTS

BACKGROUND

The present application relates generally to an improved data processing apparatus and method and more specifically to mechanisms for optimizing energy efficiency in multicore processors under quality of service (QoS)/performance constraints.

Dynamic voltage and frequency scaling (DVFS) is a popular technique for power saving in a computing system. If the throughput required of a processor is low, clock frequency and the supply voltage may be reduced while maintaining throughput. In multicore processors, another option for power saving is to consolidate work to a subset of processor cores, allowing the remaining unused cores to be put in a deep sleep state or power gated, which may be referred to as core folding. Interestingly, core folding is orthogonal to and may be combined with DVFS to maximize power savings. As technology progresses, power saving techniques like core folding may become increasingly important, due to the reduction in the overall DVFS range.

SUMMARY

In one illustrative embodiment, a method, in a data processing system, is provided for optimizing energy efficiency in a set of processor cores while maintaining application performance for a set of applications. The illustrative embodiment receives a quality of service (QoS) level for one or more active applications in the set of applications. The illustrative embodiment identifies state information associated with each processor core in the set of processor cores. The illustrative embodiment implements a change to reduce power utilization by one or more processor cores in the set of processor cores in the data processing system in response to the QoS level and the state information indicating an action to be implemented. In the illustrative embodiment, the change is via at least one of dynamic frequency scaling, dynamic voltage scaling, or core folding.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
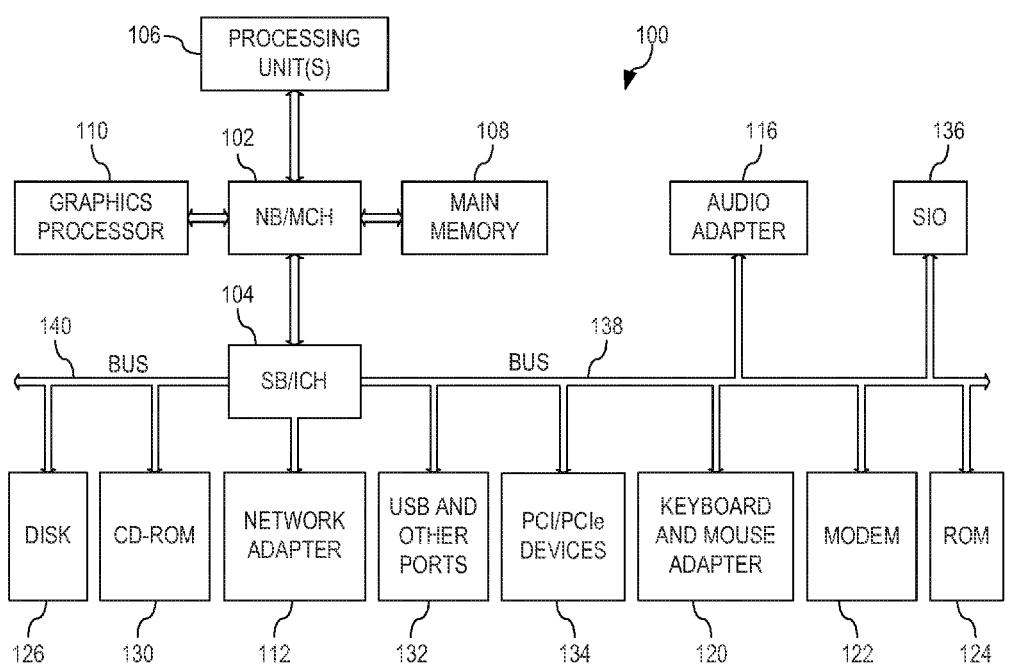
FIG. 1 is an example block diagram of a computing device in which aspects of the illustrative embodiments may be implemented.

For applications that require a quality of service (QoS) level, the QoS level may not necessarily equate to the application's throughput and may not always be deduced from the system load or utilization. Observing a QoS agreement while saving power may also be challenging because reducing power consumption generally tends to increase execution time. An additional challenge is to dynamically coordinate dynamic voltage and frequency scaling (DVFS) and core folding while observing their impact on QoS. When employed separately, decisions regarding DVFS and core folding are often made based on the measured system utilization. However, this utilization-based approach may not be efficient if the hardware mechanism for measuring the system utilization does not accurately reflect the system capacity considering the workload that is being run. For instance, a memory-bound application may appear to be highly utilizing a processor's resources when this is in fact not the case.

The illustrative embodiments provide a mechanism that efficiently coordinates DVFS and core folding to save power based on direct feedback from an application. This feedback is in the form of data that describes the application's state relative to a throughput requirement or quality of service (QoS) contract. In order to maximize the combined benefit and avoid conflicts that may arise from independent DVFS and core folding mechanisms, the illustrative embodiment utilize a single controller mechanism that is responsible for both DVFS and core folding. Further, the illustrative embodiments provide for applications to communicate with the power management controller regarding impact of the power saving measures on the application's quality of service. This direct feedback from the application is more accurate and allows for bigger power savings than simply considering a metric such as system utilization.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

A "mechanism," as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure or method for executing the functions, or a combination of the above.

Thus, the illustrative embodiments may be utilized in many different types of data processing environments. In order to provide a context for the description of the specific elements and functionality of the illustrative embodiments, FIG. 1 is provided hereafter as an example environment in which aspects of the illustrative embodiments may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

FIG. 1 is a block diagram of an example data processing system in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 100.

As a server, data processing system 100 may be, for example, an IBM® eServer™ System p® computer system, running the Advanced Interactive Executive (AIX®) operating system or the LINUX® operating system. Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device that is configured with flash memory to provide non-volatile memory for storing operating system files and/or user-generated data, for example. Essentially, data processing system 100 may be any known or later developed data processing system without architectural limitation.

Unlike reliance on metrics such as system utilization, it is more difficult to make power saving decisions based on quality of service. For example, frequency reduction may alter the application's response time in a way that is not as easy to predict and may vary at different throughput levels. For this reason, the illustrative embodiments provide a controller mechanism that makes power saving decisions based on an application's self-reported level of service. The controller mechanism makes small changes in the frequency and/or a number of processor cores used based on the current transaction response times relative to the specified limit.

Figure 2:
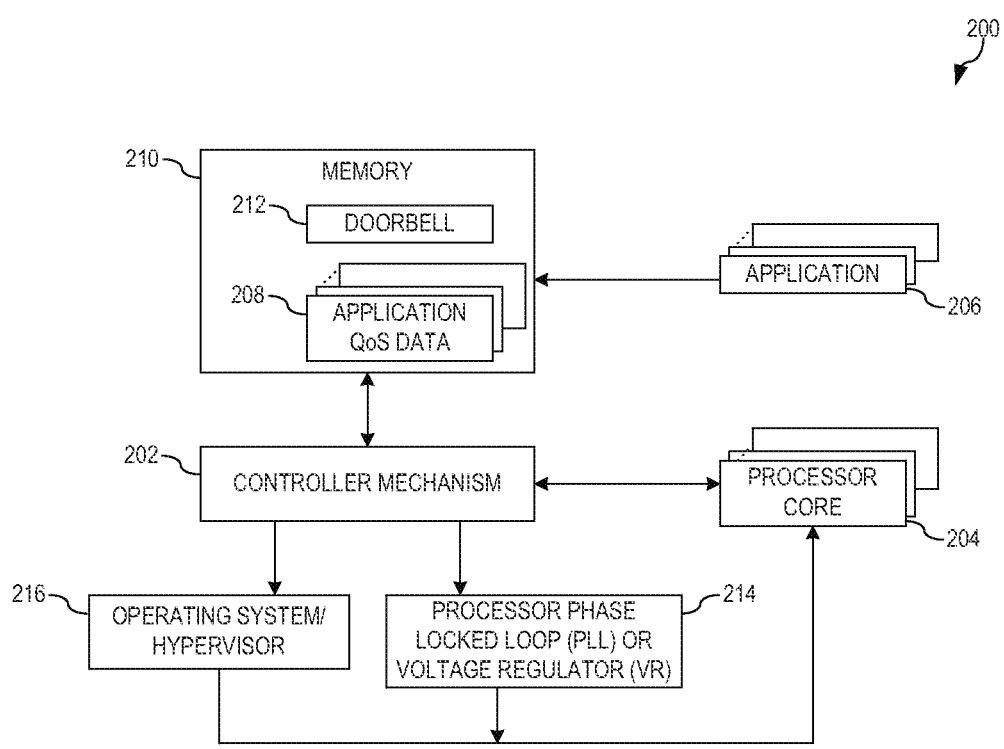
FIG. 2 depicts a controller mechanism that efficiently coordinates dynamic voltage and frequency scaling (DVFS) and core folding to save power based on direct feedback from an application with regard to quality of service (QoS)/performance constraints in accordance with an illustrative embodiment.

FIG. 2 depicts a controller mechanism that efficiently coordinates dynamic voltage and frequency scaling (DVFS) and core folding to save power based on direct feedback from an application with regard to quality of service (QoS)/performance constraints in accordance with an illustrative embodiment. At the end of each predetermined time interval, controller mechanism 202 in data processing 200 detects a current state of a set of processor cores 204, such as a number of processor cores 204 that are folded, a current operating frequency and voltage of each of processor cores 204 that are active, or the like. Controller mechanism 202 further detects a current quality of service (QoS) level for each of a set of applications 206 executing in data processing system 200. That is, at regular intervals, each active application in the set of applications 206 writes data about its current QoS state into an associated shared memory space 208 in memory 210 reserved for that application. The data indicating the QoS level of the application may be indicative of throughput, transaction rate, response time, or the like, experienced by each of applications 206, or may be used for analytic analysis using estimators, regression classifiers, or the like, to derive QoS level indicators for each of applications 206. Further, each of the set of applications may be throughput sensitive, latency sensitive, CPU bounded, memory bounded, I/O bounded, or the like. After writing the application QoS data to the associated shared memory space 208, each active application in the set of applications 206 writes to an associated doorbell 212 in memory 210 which triggers a signal to controller mechanism 202 indicating the information is available.

If controller mechanism 202 determines that all of processor cores 204 are active and the QoS level of each of the set of applications indicates no warning or violation, controller mechanism 202 attempts to decrease the operating frequency only or both operating frequency and voltage of one or more of the set of processor cores 204 via processor phase locked loop (PLL), or both PLL and voltage regulator (VR) 214. The warning or violation may be a threshold in terms of the fraction of transactions that are allowed to violate a specified response time limit for each of applications 206. Thus, the warning threshold may be a threshold that is slightly higher than the violation threshold.

Controller mechanism 202 attempts to reduce the frequency incrementally as long as there are enough transactions not violating the response time limit. However, the operating frequency of the processor cores 204 are constrained by both a minimum operating frequency ($F_{min}$) and a maximum operating frequency ($F_{max}$). That is, once all of the set of processor cores 204 reaches $F_{min}$, core folding is enabled and controller mechanism 202 may incrementally fold that processor core via operating system or hypervisor 216. Thus, if all of the operating frequencies of the set of processor cores 204 is already at $F_{min}$, then controller mechanism 202 may fold one or more of a subset of the set of processor cores 204 that are already operating at $F_{min}$ via operating system or hypervisor 216.

If, at the end of an interval, controller mechanism 202 determines that all of processor cores 204 are active and the QoS level of any of the set of applications indicates a warning, rather than attempting to lower the operating frequency of any one of the set of processor cores 204, controller mechanism 202 may fold one or more of the set of processor cores 204 via operating system or hypervisor 216. That is, since the QoS level indication is just a warning and not an actual violation, controller mechanism 202 attempts to provide more power savings by just folding one or more of the set of processor cores 204 via operating system or hypervisor 216. However, if, at the end of an interval, controller mechanism 202 determines that all of processor cores 204 are active and the QoS level of any of the set of applications indicates a violation, controller mechanism 202 attempts to increase the operating frequency only or both operating frequency and voltage of each of the set of processor cores 204 up to $F_{max}$ if possible via processor PLL or VR 214. In some embodiments, the operating frequency of only the processor cores on which the application with the QoS level violation is running may be increased up to $F_{max}$ if possible.

If, at the end of an interval, controller mechanism 202 determines that one or more of processor cores 204 are folded, the QoS level of each of the set of applications indicates no warning or violation, and the one or more of the processor cores are at $F_{min}$, then controller mechanism 202 may fold one or more of a subset of the set of processor cores 204 that are already operating at $F_{min}$ via operating system or hypervisor 216. If, at the end of an interval, controller mechanism 202 determines that one or more of processor cores 204 are folded and the QoS level of any of the set of applications indicates a warning, controller mechanism 202 attempts to provide more power savings by just folding one or more of the set of processor cores 204 via operating system or hypervisor 216. If, at the end of an interval, controller mechanism 202 determines that one or more of processor cores 204 are folded and the QoS level of any of the set of applications indicates a violation, controller mechanism 202 unfolds one or more of processor cores 204 via operating system or hypervisor 216. Thus, once one or more of the set of processor cores 204 have been folded (i.e., core folding is enabled), controller mechanism 202 freezes the frequency until all of processor cores 204 are once again unfolded.

In order to improve power savings and account for potential changes in the workload, a "reset" action is also included. For example, controller mechanism 202 reduces frequency until the warning threshold is reached, which happens above $F_{min}$. At this point, the frequency will be fixed and folding will be enabled, and die expectation is that the number of violations are to remain above the warning threshold. However, if controller mechanism 202 sees that the number of violations is below the warning threshold, but that some cores are folded and the frequency is above $F_{min}$, controller mechanism 202 recognizes that core folding was previously enabled due to a warning. Therefore, controller mechanism 202 realizes that there is no longer a warning condition due to a decrease in the system load. This means that more power could potentially be saved by reinstating DVFS. As a simple solution, controller mechanism 202 unfolds all of processor cores 204 via operating system or hypervisor 216. Otherwise, the controller could get "stuck" running data processing system 200 at a higher frequency with most of the set of processor cores 204 folded.

Therefore, using DVFS and core folding, controller mechanism 202 allows for a large number of potential operating points, since at each frequency, any number of the set of processor cores 204 may theoretically be power gated. Controller mechanism 202 operates initially utilizing DVFS above core folding when combining the two for maximum power savings. However, since frequency scaling often has a more significant negative impact on response time, when minimizing power within a quality-of-service limit, controller mechanism 202 may initiate core folding above the minimum frequency to avoid QoS violations. In modern, multi-threaded superscalar processors, it is likely that there is unused processing capacity available in the processor cores to run more threads. As a result, switching from frequency scaling to core folding allows increased power savings within the QoS limit.

It should also be noted that, when decreasing frequency of a processor core, the voltage is also reduced accordingly if possible, and, when increasing frequency of a processor core, the voltage will have to be raised to allow operation at the higher frequency if necessary. It should be further noted that the set of processor cores, over which the operations performed by controller mechanism 202 are conducted, may include the entire set of processor cores available in a data processing system, over each individual processor chip or other hardware granularity, or may be separately carried out for each set of processor cores over which a particular application is run. In some alternative embodiments, before deciding to fold a predetermined number of processor cores, controller mechanism 202 may test to determine whether the process alternately folds and unfolds processor cores over a predetermined number of successive passes. If so, controller mechanism 202 avoids folding cores for another predetermined number of passes in order to prevent repeated folding and unfolding of cores in an oscillatory pattern.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (RDM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 3:
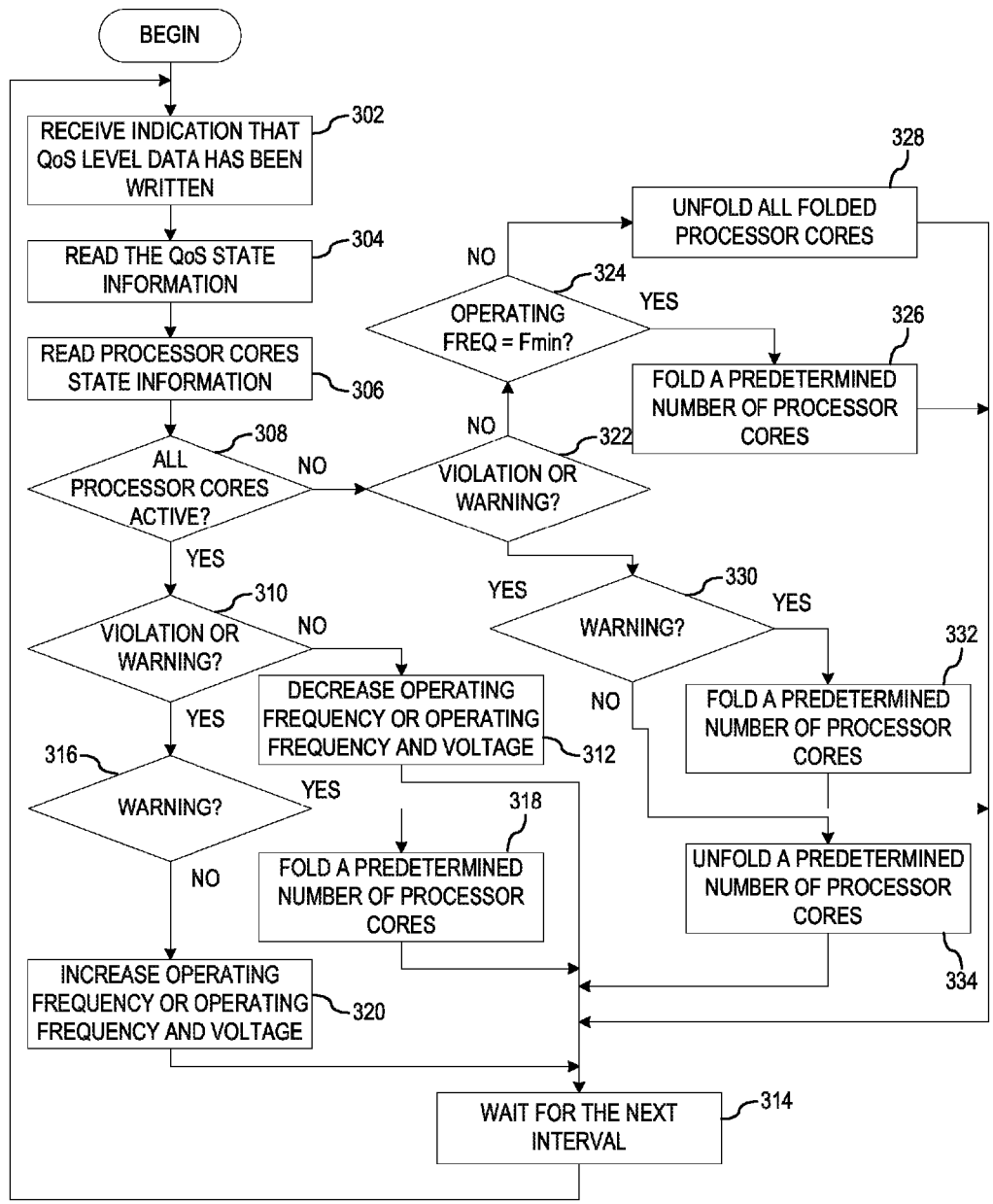
FIG. 3 depicts a flowchart of the operation performed by the controller mechanism in efficiently coordinating dynamic voltage and frequency scaling (DVFS) and core folding to save power based on direct feedback from an application with regard to quality of service (QoS)/performance constraints in accordance with an illustrative embodiment.

FIG. 3 depicts a flowchart of the operation performed by the controller mechanism in efficiently coordinating dynamic voltage and frequency scaling (DVFS) and core folding to save power based on direct feedback from an application with regard to quality of service (QoS)/performance constraints in accordance with an illustrative embodiment. As the operation begins, the controller mechanism receives a signal from one or more active applications indicating that data about the active applications QoS state has been written to an associated shared memory space in a memory (step 302). Responsive to this signal, the controller mechanism reads the QoS state information (step 304). The controller mechanism then detects a current state of a set of processor cores (step 306). The state information associated with the set of processors may include, a number of processor cores in the set of processor cores that are folded, a current operating frequency and voltage of each active processor core in the set of processor cores, or the like.

The controller mechanism then determines whether all of the set of processor cores are active (step 308). If at step 308 all of the set of processor cores are active, then the controller mechanism determines whether the one or more of the QoS levels from the set of active applications indicates a warning or violation (step 310). If at step 310 none of the QoS levels from the set of active applications indicates a warning or violation, then the controller mechanism decreases the operating frequency of one or more of the set of processor cores (step 312). The controller mechanism then waits for the next interval (step 314), with the operation returning to step 302 thereafter. If at step 310 one or more of the QoS levels from the set of active applications indicates a warning or violation, the controller mechanism determines whether the indication is a warning (step 316). If at step 316 the indication is a warning, then the controller mechanism folds a predetermined number of processor cores (step 318), with the operation proceeding to step 314 thereafter. If at step 316 the indication is not a warning but a violation, then the controller mechanism increases the operating frequency of one or more of the set of processor cores (step 320), with the operation proceeding to step 314 thereafter.

If at step 308 all of the set of processor cores are not active, then the controller mechanism determines whether the one or more of the QoS levels from the set of active applications indicates a warning or violation (step 322). If at step 322 none of the QoS levels from the set of active applications indicates a warning or violation, then the controller mechanism determines whether the operating frequency of all of the set of active applications are equal to $F_{min}$ (step 324). If at step 324 the operating frequency of all of the set of processor cores are equal to $F_{min}$, then the controller mechanism folds a predetermined number of processor cores (step 326), with the operation proceeding to step 314 thereafter. If at step 324 the operating frequency of any one of the set of processor cores is greater than $F_{min}$, then the controller mechanism unfolds all folded processor cores in the set of processor cores (step 328), with the operation proceeding to step 314 thereafter.

If at step 322 one or more of the QoS levels from the set of active applications indicates a warning or violation, the controller mechanism determines whether the indication is a warning (step 330). If at step 330 the indication is a warning, then the controller mechanism folds a predetermined number of processor cores (step 332), with the operation proceeding to step 314 thereafter. If at step 330 the indication is not a warning but a violation, then the controller mechanism unfolds a predetermined number of cores (step 334), with the operation proceeding to step 314 thereafter.

It should also be noted that, when decreasing frequency of a processor core, the voltage is also reduced accordingly if possible, and, when increasing frequency of a processor core, the voltage will have to be raised to allow operation at the higher frequency if necessary. It should be further noted that the set of processor cores, over which the operations in the flowchart in FIG. 3 are conducted, may include the entire set of processor cores available in a data processing system, over each individual processor chip or other hardware granularity, or may be separately carried out for each set of processor cores over which a particular application is run. In some alternative embodiments, before deciding to fold a predetermined number of processor cores in step 318 and step 332, the controller mechanism may test to determine whether the operation depicted in the flowchart of FIG. 3 alternately folds and unfolds processor cores over a predetermined number of successive passes. If so, the controller mechanism avoids folding cores for another predetermined number of passes through the flowchart of FIG. 3 in order to prevent repeated folding and unfolding of cores in an oscillatory pattern.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for efficiently coordinating dynamic voltage and frequency scaling (DVFS) and core folding to save power based on direct feedback from an application. This feedback is in the form of data that describes the application's state relative to a throughput requirement or quality of service (QoS) contract. In order to maximize the combined benefit and avoid conflicts that may arise from independent DVFS and core folding mechanisms, the illustrative embodiment utilize a single controller mechanism that is responsible for both DVFS and core folding. Further, the illustrative embodiments provide for applications to communicate with the power management controller regarding impact of the power saving measures on the application's quality of service. This direct feedback from the application is more accurate and allows for bigger power savings than simply considering a metric such as system utilization.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a computing device, causes the computing device to:
   receive a quality of service (QoS) level for one or more active applications in a set of applications;
   identify state information associated with each processor core in a set of processor cores; and
   responsive to the QoS level and the state information indicating an action to be implemented, implement the action to reduce power utilization by one or more processor cores in the set of processor cores in the data processing system, wherein the action is selected from the group consisting of a first action, a second action, a third action, a fourth action, a fifth action, a sixth action, and a seventh action, and wherein:
      responsive to the state information indicating that all of the set of processor cores are active and the QoS level indicating the absence of a violation or a warning, the first action decreases an operating frequency only or decreases the operating frequency and a voltage of the one or more processor cores in the set of processor cores in the data processing system,
      responsive to the state information indicating that all of the set of processor cores are active and the QoS level indicating a warning, the second action folds a predetermined number of processor cores in the set of processor cores in the data processing system,
      responsive to the state information indicating that all of the set of processor cores are active and the QoS level indicating a violation, the third action increases an operating frequency only or increases the operating frequency and a voltage of the one or more processor cores in the set of processor cores in the data processing system,
      responsive to the state information indicating that one or more processor cores in the set of processor cores is folded and the QoS level indicating the absence of a violation or warning, and an operating frequency of one or more processor cores in the set of processor cores being greater than a minimum operating frequency, the fourth action unfolds all folded processor cores in the set of processor cores in the data processing system,
      responsive to the state information indicating that one or more processor cores in the set of processor cores is folded and the QoS level indicating the absence of a violation or a warning, and an operating frequency of one or more processor cores in the set of processor cores being equal to a minimum operating frequency, the fifth action folds a predetermined number of processor cores in the set of processor cores in the data processing system,
      responsive to the state information indicating that one or more processor cores in the set of processor cores is folded and the QoS level indicating a warning, the sixth action folds a predetermined number of processor cores in the set of processor cores in the data processing system, or
      responsive to the state information indicating that one or more processor cores in the set of processor cores is folded and the QoS level indicating a violation, the seventh action unfolds a predetermined number of processor cores in the set of processor cores in the data processing system.

2. The computer program product of claim 1, wherein the set of processor cores is at least one of all of the processor cores in the data processing system, a set of processor cores in an individual processor chip, or a set of processor cores over which a particular application is executed.

3. The computer program product of claim 1, wherein the QoS level of the set of applications is indicative of throughput, transaction rate, or response time experienced by the set of applications and wherein the QoS level of the set of applications is derived through analytic analysis of estimators or regression classifiers.

4. An apparatus comprising:
   a processor, and
   a memory coupled to the processor, wherein the memory comprises instructions which, when executed by the processor, cause the processor to:
   receive a quality of service (QoS) level for one or more active applications in a set of applications;
   identify state information associated with each processor core in a set of processor cores; and
   responsive to the QoS level and the state information indicating an action to be implemented, implement the action to reduce power utilization by one or more processor cores in the set of processor cores in the data processing system, wherein the action is selected from the group consisting of a first action, a second action, a third action, a fourth action, a fifth action, a sixth action, and a seventh action, and wherein:
      responsive to the state information indicating that all of the set of processor cores are active and the QoS level indicating the absence of a violation or a warning, the first action decreases an operating frequency only or decreases the operating frequency and a voltage of the one or more processor cores in the set of processor cores in the data processing system, responsive to the state information indicating that all of the set of processor cores are active and the QoS level indicating a warning, the second action folds a predetermined number of processor cores in the set of processor cores in the data processing system, responsive to the state information indicating that all of the set of processor cores are active and the QoS level indicating a violation, the third action increases an operating frequency only or increases the operating frequency and a voltage of the one or more processor cores in the set of processor cores in the data processing system, responsive to the state information indication that one or more processor cores in the set of processor cores is folded and the QoS level indicating the absence of a violation or warning, and an operating frequency of one or more processor cores in the set of processor cores being greater than a minimum operating frequency, the fourth action unfolds all folded processor cores in the set of processor cores in the data processing system, responsive to the state information indicating that one or more processor cores in the set of processor cores is folded and the QoS level indicating the absence of a violation or a warning, and an operating frequency of one or more processor cores in the set of processor cores being equal to a minimum operating frequency, the fifth action folds a predetermined number of processor cores in the set of processor cores in the data processing system, responsive to the state information indicating that one or more processor cores in the set of processor cores is folded and the QoS level indicating a warning, the sixth action folds a predetermined number of processor cores in the set of processor cores in the data processing system, or responsive to the state information indicating that one or more processor cores in the set of processor cores is folded and the QoS level indicating a violation, the seventh action unfolds a predetermined number of processor cores in the set of processor cores in the data processing system.

5. The apparatus of claim 4, wherein the QoS level of the set of applications is indicative of throughput, transaction rate, or response time experienced by the set of applications and wherein the QoS level of the set of applications is derived through analytic analysis of estimators or regression classifiers.

6. The apparatus of claim 4, wherein the set of processor cores is at least one of all of the processor cores in the data processing system, a set of processor cores in an individual processor chip, or a set of processor cores over which a particular application is executed.

* * * * *